US006530527B1

(12) United States Patent
Ahlers et al.

(10) Patent No.: US 6,530,527 B1
(45) Date of Patent: Mar. 11, 2003

(54) VALUE OR SECURITY PRODUCT WITH LUMINESCENT SECURITY ELEMENTS AND METHOD FOR THE PRODUCTION AND USE THEREOF IN RESPECT TO VISUAL AND MACHINE-OPERATED DETECTION OF AUTHENTICITY

(75) Inventors: Benedikt Ahlers, Berlin (DE); Arnim Franz-Burgholz, Berlin (DE); Roland Gutmann, Berlin (DE); Wolfgang Schmidt, Berlin (DE); Frank Kappe, Berlin (DE)

(73) Assignee: Bundesdruckerei, Berlin (DE)

( * ) Notice: Subject to any disclaimer, the term of this patent is extended or adjusted under 35 U.S.C. 154(b) by 0 days.

(21) Appl. No.: 09/380,501

(22) PCT Filed: Feb. 25, 1998

(86) PCT No.: PCT/EP98/01059

§ 371 (c)(1), (2), (4) Date: Nov. 16, 1999

(87) PCT Pub. No.: WO98/39163

PCT Pub. Date: Sep. 11, 1998

(30) Foreign Application Priority Data

Mar. 4, 1997 (DE) ........................................ 197 08 543

(51) Int. Cl.[7] ........................ G06K 19/06; G06K 19/00
(52) U.S. Cl. ........................ 235/491; 235/487; 235/494
(58) Field of Search ................................ 235/491, 494, 235/488, 470, 454, 487; 283/72, 83; 427/7; 101/150

(56) References Cited

U.S. PATENT DOCUMENTS 5,301,982 A * 4/1994 Brotz .......................... 283/83
5,496,582 A * 3/1996 Mizutani et al. .............. 427/66
5,535,871 A * 7/1996 Harbaugh ................... 194/206
5,932,327 A * 8/1999 Inoguchi et al. ............ 428/212
6,144,156 A * 11/2000 Lutschounig et al. ....... 313/506

FOREIGN PATENT DOCUMENTS

| | | | |
|---|---|---|---|
| DE | 1934946 | 1/1970 | H05B/33/12 |
| DE | 3121523 | 4/1982 | B44F/1/12 |
| DE | 3038178 | 6/1982 | B44F/1/12 |
| DE | 3121484 | 4/1983 | B44F/1/12 |
| DE | 3531442 | 3/1986 | G02E/1/17 |
| DE | 3824749 A1 * | 2/1989 | |
| DE | 3802317 | 8/1989 | H05B/33/26 |
| DE | 4002979 | 8/1991 | B44F/1/12 |
| DE | 4126051 | 2/1993 | B44F/1/12 |
| DE | 4315244 | 11/1993 | C23C/14/06 |
| DE | 4310082 | 9/1994 | H05B/33/14 |
| DE | 4440242 | 5/1996 | C09B/5/62 |
| DE | 29606511 | 8/1996 | G09F/13/22 |

* cited by examiner

*Primary Examiner*—Karl D. Frech
*Assistant Examiner*—April Nowlin
(74) *Attorney, Agent, or Firm*—The Maxham Firm

(57) ABSTRACT

A value or security product such as a banknote, ID card or the like, is provided with luminescent security elements which are excitable in an electromagnetic alternating field. A production method of applying the required colors and substances to the value or security product is also provided. Also included is a respective security technology arrangement for visual and machine-operated detection of authenticity, where electrical fields in particular and optical radiation, preferably in the UV wavelength range, are used to excite so-called phosphorous colors, and additional optical effects in the visible UV wavelength range can be achieved by secondary excitation mechanisms.

27 Claims, 12 Drawing Sheets

VALUE OR SECURITY PRODUCT WITH LUMINESCENT SECURITY ELEMENTS AND METHOD FOR THE PRODUCTION AND USE THEREOF IN RESPECT TO VISUAL AND MACHINE-OPERATED DETECTION OF AUTHENTICITY

BACKGROUND

1. Field of the Invention

The present invention concerns security documents with safety features in graphical form, preferably using intaglio printing, that can be caused to illuminate as points, strips, and/or surfaces. The targeted wavelengths are in the invisible UV range up to the range visible to the human eye, typically from 360 to 780 nm, as well as within the infrared range.

2. Discussion of the Related Art

In German Patent 43 10 082, electroluminescent foils are presented that are manufactured of inorganic, electroluminescent pigments and thermoplastic synthetics by means of extrusion or co-extrusion. In principle, extrusion or co-extrusion of this type of system onto security paper is conceivable, but graphical design options seem to be limited by process logistics. Also, the overall manufacturing process to produce a security document and the associated authenticity testing arrangement required for it appear to be very expensive.

In German Patent 43 15 244, a process is described that produces an electroluminescent film using sputtering technology. This process would also be fundamentally conceivable for the production of security documents, but a production process of this type would be extremely expensive due to the vacuum chambers necessary for this technology. This process would also be very difficult to integrate into a possible manufacturing process and it produces film layers that would have to be equipped with special added layers to withstand the high mechanical requirements of security documents.

In German Patent 41 26 051, a security document is presented having an embedded surface security element (security fibers). This document is designed with multiple layers and exhibits electroluminescent properties. A disadvantage of this arrangement is that a relatively high surface buildup must be taken into account since the electrodes that are necessary to excite the EL substances lie one on top of the other.

U.S. Pat. No. 4,355,300 shows a testing device to mechanically test the authenticity of a security document. An alternating voltage is applied to an opposing electrode arrangement and produces an electric field between the two electrodes. By placing the security document, with its security features contained on it, between the electrodes, the dielectric constant is modified inside the field gap (the dielectric constant is material-dependent). This changes the capacitive resistance, which can be measured using a measuring instrument and can be evaluated in an evaluation unit. However, this printed document contains no electrically excitable substances that are excited within the field gap and consequently no electromagnetic radiation is measured in the form of emitted photons. The device parameters must therefore be selected according to a measured condenser voltage and not according to a measured electromagnetic radiation.

SUMMARY OF THE INVENTION

A primary purpose of the invention, based on German Patent 41 26 051, is to further develop a value/security instrument with EL-active security features that have a considerably thinner layer construction on the surface of the security document.

This objective is met by means of the technical methods described, which provides an essentially planar electrode arrangement located on the value/security instrument. The electrodes lie next to one another in approximately the same plane and form a field gap between them. The field lines of the alternating electromagnetic field produced in the field gap penetrate the EL substances.

In this arrangement, there is a series of different embodiments of the invention. Applying the EL substances using steel plate intaglio printing and other printing processes employ the method of the invention. In particular, dry offset printing, wet offset printing, screen-printing, non-impact printing techniques and novel digital printing processes are among the alternative embodiments.

Instead of layering electrodes one on top of the other—as the state of the technology is well-known for—these types of electrodes are applied to the value/security instrument and/or testing device in an adjacent surface arrangement, at least partially. An advantage of the invention is thus the elimination a multi-layered arrangement of surface EL systems on top of one another.

In the present state of the technology, the fear is that the known laminate construction, which is subject to extreme sustained stress requirements, may not be sufficiently wear resistant. Another disadvantage is that a security fiber is not an integral component of a value/security instrument and can be removed. This known arrangement requires electrical contacts to be applied to the value/security instrument. In contrast, some of the embodiments of the invention do not need a contact on the value/security instrument.

In contrast to common electroluminescent (referred to as EL) systems that are built between surface electrodes, one variation of this invention does away with this relatively thick construction by building the electric field laterally, or within the surface itself. For an EL plate-condenser type construction according to the invention (in which, according to the invention, the condenser "plates" lie next to one another in essentially the same plane and the field needed for excitation is produced in the field gap between them), a transparent, electrically conducting layer is needed. This layer is attained using ITO pastes (Indium-Tin-Oxide). It can also be attained using pre-layered transparent foils or glasses.

Typically, biaxially-oriented, thermally stabilized polyester foils are used that are layered with evaporated or sputtered, electrically conducting tin oxide, ITO or, generally speaking, transparent, electrically conducting metallized surfaces. These surfaces have surface resistance values in the range of typically 20 ohms/square up to 300 ohms/square and above, and less than this for glass substrates.

High quality EL systems need an even luminous density and maximum light efficiency. Because of their high thermal strength in layering processes, glass substrates offer a higher quality solution, in general, with higher optical transmittance in the visible wavelength range with simultaneously better surface conductivity. However, the important advantage of the ITO paste printing technique, which this invention uses, is its relatively simple application and the nearly limitless graphical design possibilities. This is especially advantageous in more complex systems involving electrical connections.

Since these types of ITO screen printing pastes seldom yield surface resistances of less than 300 to 400 ohm/square, bus bars (edge strips with good electrical conductivity) are used in this invention. This creates even electrical fields and thus an even luminous density. Furthermore, this technique allows the connection of the ITO electrode to be structured with good functionality. Last but not least, the ITO electrode layer thickness can be reduced. This leads to higher transparency through its volume. According to the invention, bus bars are printed by means of printing technology using pastes of silver, carbon, copper, among others, or a combination of these elements. In this way, surface resistances in the range of a few 10 mohms/square can be attained.

According to the invention, various designs are described as follows. In each of these designs, the EL substances are excited using an alternating electromagnetic field.

1. A lateral electrode arrangement on the value/security instrument,
2. An electrode arrangement in a lateral or opposing arrangement located external to the security document, that is, in a signal detector.
3. A lateral electrode arrangement located on a transparent covering substrate in the signal detector.

In a preferred design, the value/security instrument has security elements based on microencapsulated inorganic group II and group VI compounds as found in the periodic table (for example ZnS, CdS). They are doped or activated with metals such as Cu, Mn, Ag, and are suitable for printing using intaglio printing. Also, electroluminescent security elements can be constructed on a base of organic polymers.

The electrodes are designed laterally (that is, lying flat beside one another) using conductive intaglio dyes. An alternating electromagnetic field is set up in the field gap that results between the electrodes. This gap is also flat. The field lines of this field penetrate the printed picture produced by the EL substances, at least partially, and thus cause the electroluminescent security elements to illuminate. These elements can then be subject to visual and machine authenticity testing.

In a preferred embodiment form, electrically conducting intaglio dyes are used that are based on: carbon and/or silver or a mixture of the two, or; silver- and/or gold-coated metallic pigments or mica pigments along with suitable binders based on polyurethanes and/or aliphatic polyesters and appropriate thinners. In particular, the two electrode connections are designed as a non-oxidizing surface.

An aqueous polyurethane layer (preferred) is applied to the unprepared surface of the security document—preferably a gold certificate—as a dielectric and isolation layer prior to the actual graphical structuring. Then, the EL paste is pressed on. This results in a good, elastic bond with excellent surface durability.

In this process, the preferred graphical form of the luminescent security feature consists of individual points and lines. Moreover, translucent dyes that are appropriately structured (graphically) can be applied above/below/next to the luminescent elements. In this way, different colored light effects can be attained.

A process to manufacture the security document in accordance with this invention involves the following process steps:

Graphical structuring of the substrate (specifically, special security paper with a surface weight of approximately 80 to 200 g/m$^2$) using a graphical printing process, in particular intaglio printing, dry offset printing, wet offset printing, screen printing, non-impact printing and by means of other novel, digital printing processes.

Printing of an adhesive agent, if needed, in the form of an aqueous polyurethane dispersion in order to optimally bind and embed the printed layers that are to follow.

Printing of the lateral electrodes using conducting pastes and, depending on the system, repeating this process more than once to achieve a surface resistance that exhibits sufficient current to suit the chosen geometry of the security elements or that exhibits sufficiently low surface resistance.

Printing of an isolation dye, in particular one with the properties of high elasticity and good bonding to the substrate, the conducting layer and the connected EL dyes, and which has as high a dielectric constant as possible. Aqueous polyurethane dispersion systems are particularly useful, which can be charged with barium titanate ($BaTiO_3$) to raise the dielectric constant.

Printing of the EL paste or the multi-colored illuminating phosphor pastes, with the addition of a range spacer, if needed, that can prevent the microencapsulated light pigments from being damaged at high pressures during the printing process.

If necessary, printing of translucent dyes to create additional graphical and security structure.

If necessary, printing of passivating, electrically conducting dyes onto the electrical connection points. These come in the form of special conducting dyes or pastes based, in particular, on carbon and gold.

Printing of an elastic, transparent, wear-resistant and well adhering protective layer based, in particular, on aqueous polyurethane dispersions.

Hardening of the above printed materials at the end of the printing process.

Optionally, a form of thermal pressing can be done as the last step at temperatures up to 200° C. and pressures up to 500 N/cm$^2$ in order to stabilize and improve the quality of the security document.

The preferred design of the invention is characterized according to the above description in that, among other things, lateral electrodes are first arranged using electrically conducting intaglio dyes or pastes and intaglio techniques so that geometries are achieved with extremely high resolution or fineness in the printed picture. These geometries result in high electric field strengths, enabling electroluminescent excitation of typical zinc sulfide phosphor layers.

In this sense, the intaglio print technique proposed by the invention is a very favorable solution due to the extremely high resolution and the multiple $\mu$m layer-thickness that can be achieved. However, the structures of the different intaglio dyes or pastes need to be specially adjusted to considerably smaller pigment diameters compared with screen-print dyes.

In this invention, it is important that microencapsulated elements with EL phosphor pastes are used in the intaglio printing process. Capsule diameters of a few $\mu$m (for example in the range of 0.2 to 40 $\mu$m) are used here.

In a further development of the design, novel substances are used, namely luminescent substances based primarily on silicates, phosphates, tungstates, germanates, borates, among others, that are activated by Mn. However, substances based on $Zn_2SiO_4$:Mn (typical substances for fluorescent tubes) are especially preferred.

In addition, certain EL substances can be blocked by UV filter layers, which are in the form of print dyes. For example, using $TiO_2$—filled pigments, any excitation of the EL substances caused by UV light is blocked. This will allow excitation only within the electromagnetic field. This is recommended mainly for the mechanical testing of the security document using the testing device according to the invention. In this device, in a preferred design, visible light is no longer used to perform the test.

In addition, a testing device of a general type to visually and mechanically test the authenticity of value/security documents is to be created. This testing device should allow quick, safe testing of value/security documents and should be simple to operate.

In a first embodiment of the invention, the testing device has two supports parallel to one another. The document to be tested is placed between these supports, at least one of which is transparent. At least one of the supports has an electrode arrangement that is capable of producing an alternating electromagnetic field. This field penetrates the value/security instrument, at least at the points where the EL-active security features are located.

Another embodiment exists in which the testing device has two supports parallel to one another between which the document to be tested is placed. At least one of the supports is transparent. Both supports have electrodes arranged on them that produce an alternating electric field between them similar to a plate condenser. This field penetrates the value/security instrument, at least at the points where the EL-active security features are located.

A third design consists of a testing device with two supports parallel to one another between which the document to be tested is placed. At least one of the supports is transparent. One electrode is located on the value/security instrument and a second electrode is located on one of the supports. These electrodes produce an alternating electromagnetic field between them that penetrates the value/security instrument, at least at the points where the El-active security features are located.

BRIEF DESCRIPTION OF THE DRAWING

The objects, advantages and features of the invention will be more readily perceived from the following detailed description, when read in conjunction with the accompanying drawing, wherein.

DETAILED DESCRIPTION OF THE PREFERRED EMBODIMENTS

Figure 1:
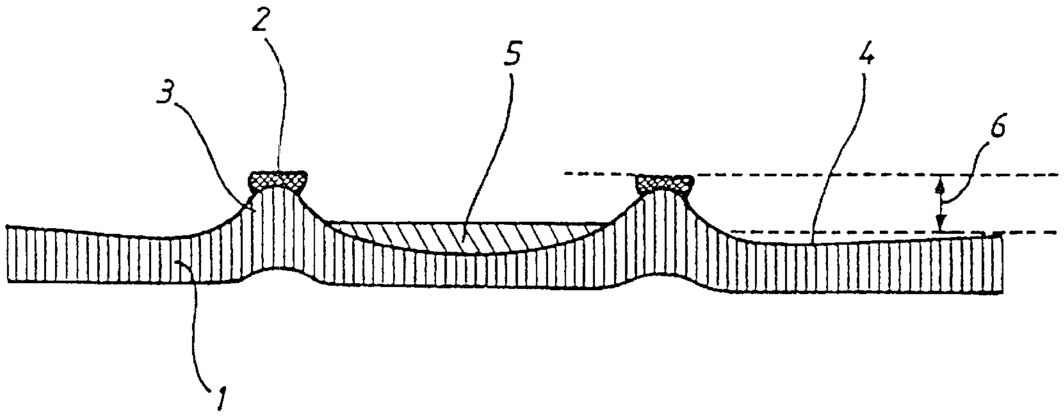
FIG. 1 is an enlarged section through a bank note containing an EL substance according to the invention.

In the following description, a value/security instrument 1 is described that is in the form of a bank note. However, the invention does not restrict itself to bank notes. The value/security instrument 1 in FIGS. 1–14 consists essentially of paper which, in the embodiment example shown, is made up of cotton fibers. Indentations are applied to the surface resulting in various raised areas 3 with a corresponding indentation base 4. It can be seen that deep-engraved intaglio dye 2 used to print the bank notes (value/security instrument 1) is deposited onto raised surfaces 3.

According to the invention, one embodiment prescribes that EL-active substances 5 are to be applied to indentation base 4 outside the deep-engraved intaglio dye 2. The depth of the indentation is specified for this type of value/security instrument at approximately 1–80 $\mu$m. The height of the intaglio dye layer on the paper corresponds to approximately 20% of the depth of the indentation or approximately 1 to 20 $\mu$m. Height 6 ranges between approximately 1 and 80 $\mu$m.

Figure 2:
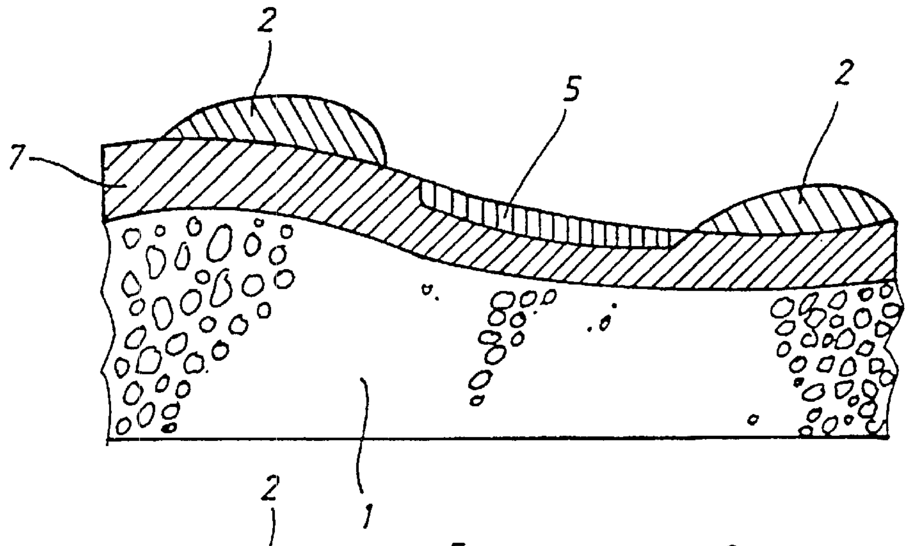
FIG. 2 is a further enlarged section through the bank note of FIG. 1 in a first embodiment of the invention.
Figure 3:
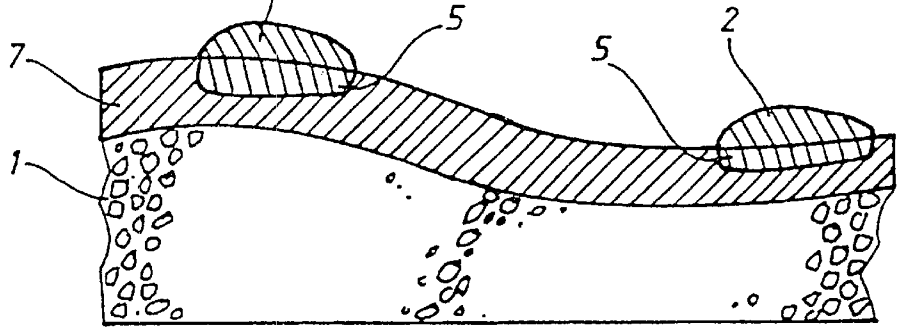
FIG. 3 shows a second embodiment of the FIG. 1 bank note.

In the enlarged section of FIG. 2, EL substances 5 are located outside the intaglio print range. FIG. 3 shows that EL substances 5 can also be located underneath deep-engraved intaglio dye 2 near raised areas 3. As a result, they are covered by the deep-engraved intaglio dye 2.

Figure 4:
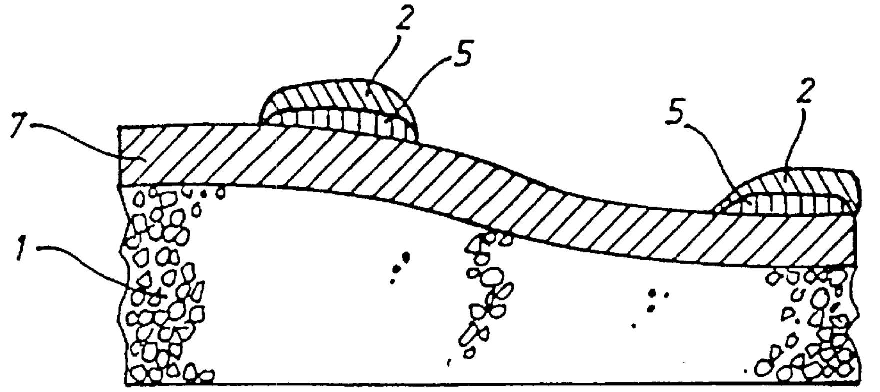
FIG. 4 is a third embodiment of the invention shown in FIG. 1.

From FIG. 3 it can be seen that the EL substances penetrate surface layer 7 on security document 1 or, as shown in FIG. 4, it can be located on top of surface layer 7 and beneath the deep-engraved intaglio dye 2.

Figure 5:
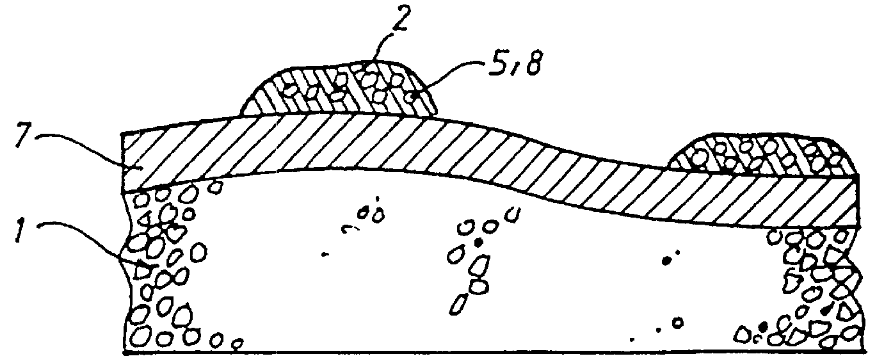
FIG. 5 shows a fourth embodiment of the invention of FIG. 1.

FIG. 5 shows another embodiment in which these EL substances 5, made up of microcapsules 8, are mixed into the deep-engraved intaglio dye 2 and are printed along with it.

Figure 6:
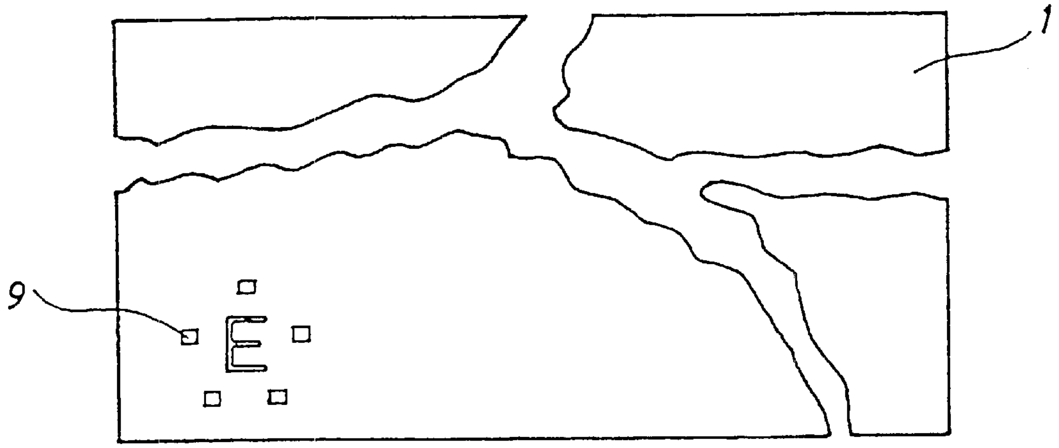
FIG. 6 is a top view of a value/security instrument with security features in accordance with the invention.
Figure 7:
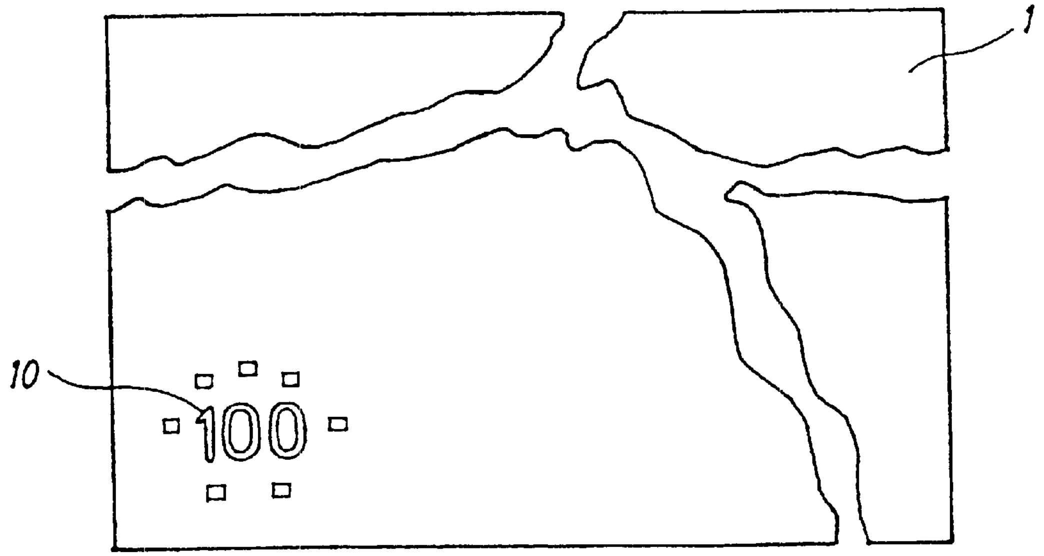
FIG. 7 shows another embodiment of a security document with security features.

The embodiments shown in FIGS. 1–5 can create security features 9, 10 as shown in FIGS. 6 and 7. In FIG. 6, these EL substances are designed as a starred wreath for a Europe symbol. In FIG. 7, these EL substances are designed as numbers inside the starred wreath.

It is obvious that any form or arrangement of EL substances is possible on the value/security instrument, either in a visible form or in a hidden form.

Figure 8:
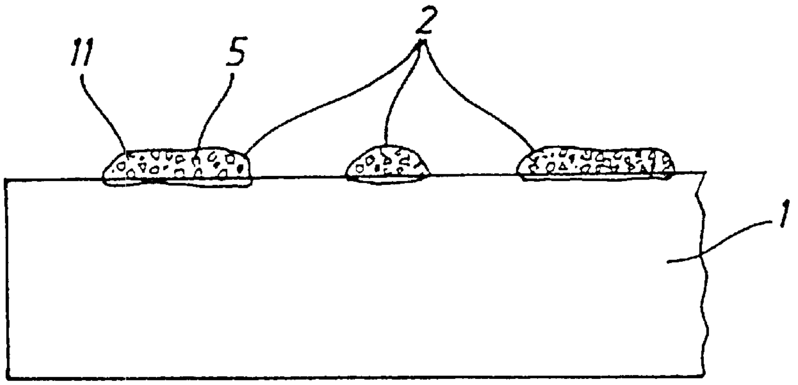
FIG. 8 is a section through a value/security instrument according to the invention in another embodiment thereof.
Figure 9:
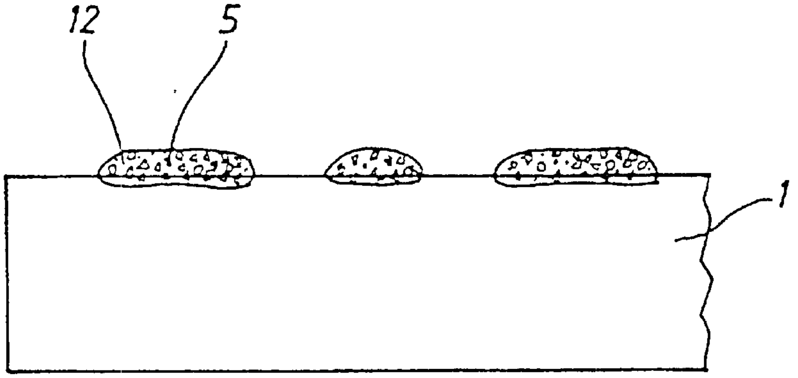
FIGS. 9–11 show still other embodiments of security documents in accordance with the invention.

FIGS. 8 and 9 show further that the EL substances can be mixed into the deep-engraved intaglio dye 2 in pigment form. A binder 11 is preferably used here. In addition, according to FIG. 9, luminous dyes 12 can be mixed in to bring the light emission of the EL substances (containing the luminous dyes 12) to a characteristic illumination of security features 9.

Figure 10:
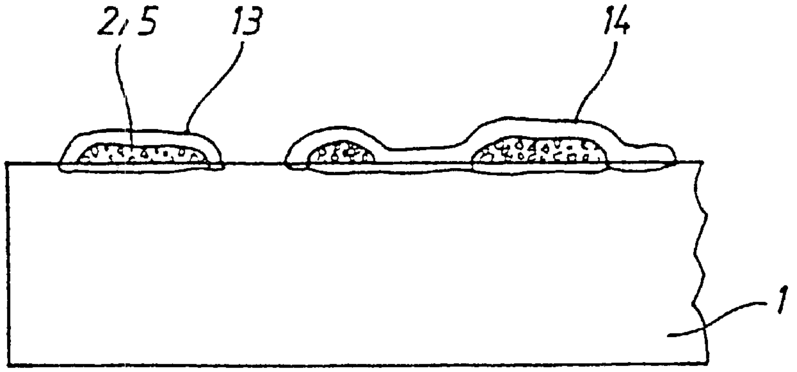
Figure 11:
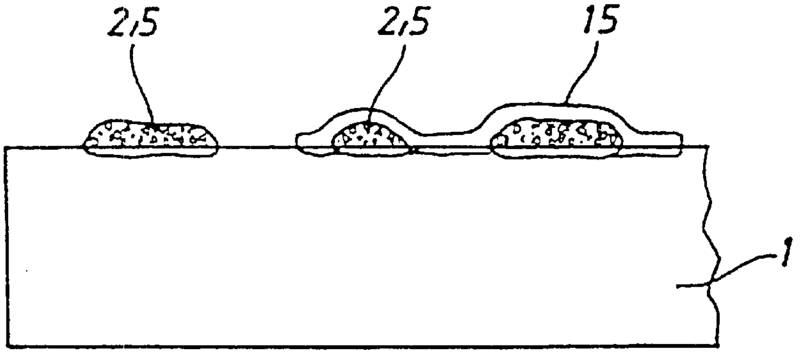

FIGS. 10 and 11 show that, in addition to the use of luminous dyes, translucent print dyes 13, 14 can be used in which different color schemes, such as green and red print dyes, can be printed at separate points. This gives the EL substances, each illuminating in a single color, a varying visual color scheme. Also, according to FIG. 11, the above colors can even be covered with a translucent print dye with an added UV filter. The translucent dyes 13, 14 can also be applied beneath the EL layer.

In the following examples, another embodiment will be described in which the electrodes needed to produce the alternating electromagnetic field are applied only to the value/security instrument. Alternatively, at least one electrode can be applied to the value/security instrument while the other electrode is located on the test device.

Figure 12:
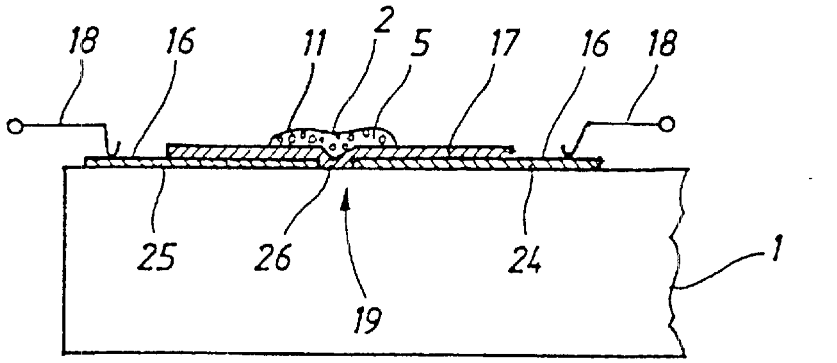
FIG. 12 is a section through a value/security instrument with lateral electrodes applied to the surface in accordance with the invention.
Figure 13:
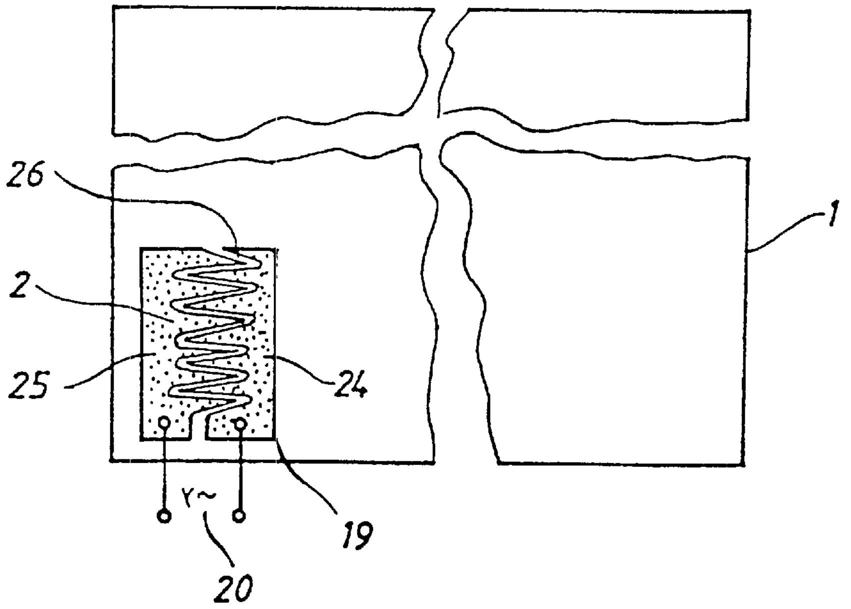
FIG. 13 is a top view of the FIG. 12 embodiment.

FIGS. 12 and 13 show an electrode arrangement 19 consisting of two electrodes 24, 25 arranged on the surface of security document 1. Electrodes 24, 25 are arranged as flat elements lying next to one another (laterally). Between them is a zig-zag shaped isolating field gap 26. Within this gap, the electromagnetic field necessary to excite the EL substances 5 is produced.

In the embodiment shown, the two electrodes 24, 25 are at least partially covered by isolating print dye 17. Electrodes 24, 25 themselves are produced using conductive print dyes 16. Associated contacts 18 are attached to the print dyes and contacts 18 have an alternating voltage applied to them. This is shown in FIG. 13, which shows that an alternating voltage is applied at connections 20.

The EL-active substance 5 is embedded in the deep-engraved intaglio dye 2 and sits at least partially across the field gap 26 so that the field lines produced in the field gap penetrate the security feature that is sitting on field gap 26. This causes the substance to illuminate.

Figure 14:
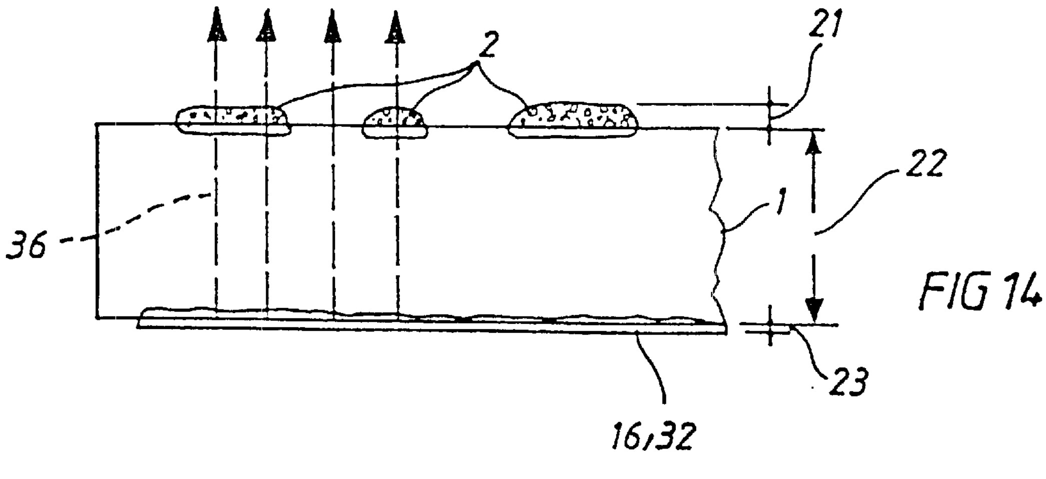
FIG. 14 is an alternative embodiment of a security document with a surface electrode in accordance with the invention.

FIG. 14 shows a modification of the embodiment of FIGS. 12 and 13. In this design, a flat electrode 32 can be applied to the bottom of the security document 1 in the form of conductive print dye 16 and contacts can be applied as well. The value/security instrument 1 contains a printed EL picture 29 corresponding to the embodiments shown in FIGS. 1–11 (see, for example, FIGS. 15 and 16). The opposite electrode (not shown) is located at a support of a testing device that will be described in more detail in connection with the rest of the illustrations.

The alternating field 36 created between the two electrodes penetrates the EL substances and causes them to illuminate. For example, the height of the intaglio dye is typically 10 to 20 $\mu$m above the base of security document 1 (height 21). On the other hand, the thickness 22 of the security document 1 is typically 100 $\mu$m with a surface weight of 90 g/m$^2$. The thickness 23 of the lower surface electrode 32 is approximately 3 to 10 $\mu$m.

With reference now to FIGS. 15–30, various embodiments of testing devices in accordance with the invention are illustrated. At the same time, other designs of security documents with various arrangements of EL-active substances are also given.

Figure 15:
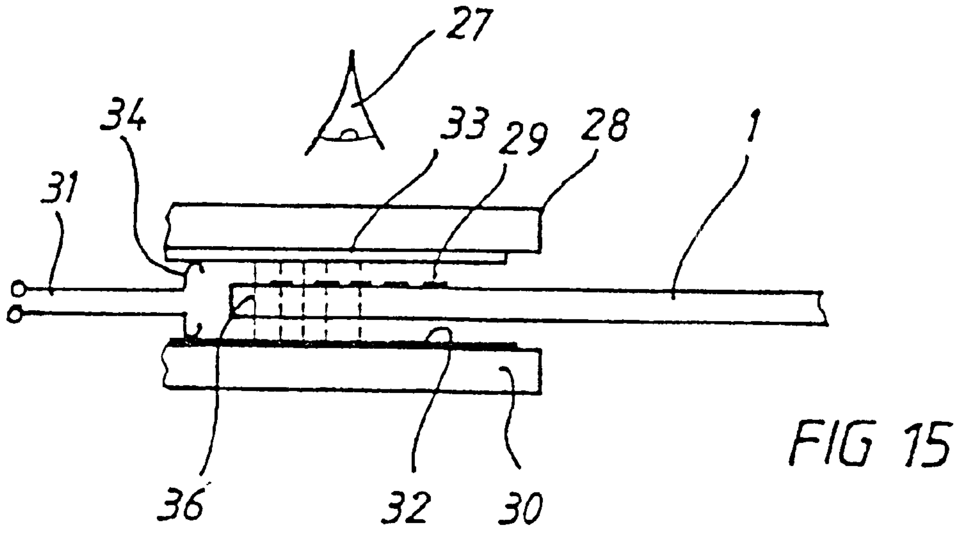
FIG. 15 shows an arrangement of a security document in a first embodiment of a test device in accordance with the invention.

In FIG. 15, it can be seen that a testing device consists essentially of two supports 28, 30 separated from one another. The upper support 28, which preferably faces the viewer 27, is designed to be transparent and has a transparent, electrically conducting layer made of glass or plastic on the inside, constituting the electrode 33. One contact 34 is placed at this electrode, which is connected to the first pole through connection 31. The opposite electrode 32 is made of aluminum-Eloxal and is applied to the inside surface of the lower support 30 and is also connected to the other pole of the connection 31 through contact 34.

An alternating electromagnetic field 36 is thus applied between the two electrodes 32, 33, which penetrates value/security instrument 1 placed between the supports 28, 30. This alternating field also penetrates the EL-active substances and causes the printed EL picture 29, made up of these substances, to illuminate.

Figure 16:
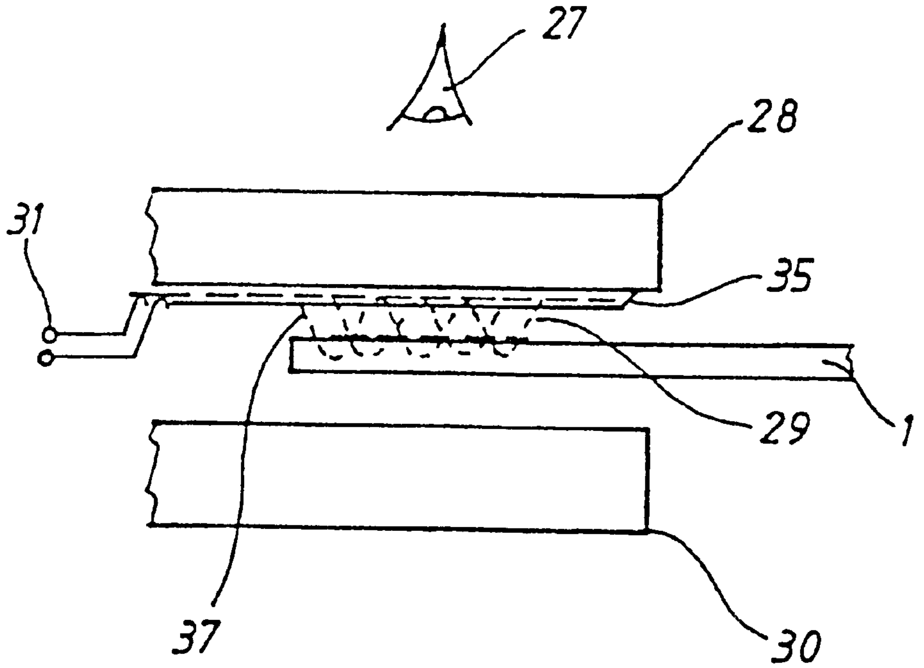
FIG. 16 is an alternative embodiment of a security document in a test device in accordance with the invention.

FIG. 16 shows a variation to the embodiment of FIG. 15. This shows that an electrode arrangement 35 can also be located at only one support 28, utilizing an electrode arrangement similar to electrode arrangement 19 in FIG. 13 or, in another embodiment form, as shown by the electrode arrangement according to FIG. 17.

Figure 17:
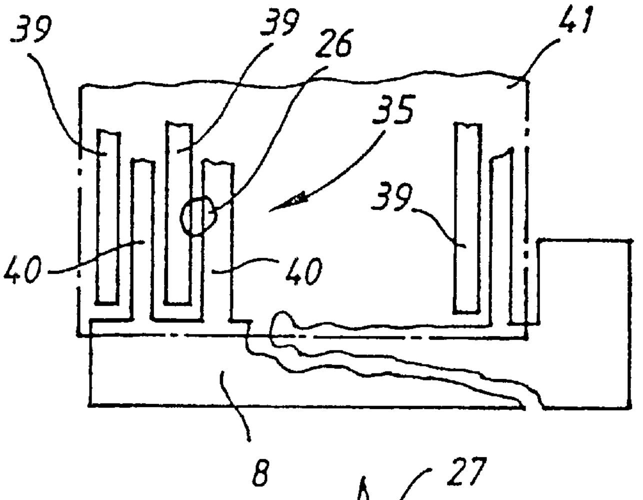
FIG. 17 is an enlarged representation of lateral electrodes employed in the invention.

Upper support 28 consists of a transparent glass or plastic with a planar electrode arrangement 35 as shown in more detail in FIG. 17. This electrode arrangement is made up of finger-shaped electrodes 39, 40 that mesh together. These electrode fingers have a field gap 26 between them and are isolated from one another. The entire arrangement is applied onto isolation layer 41 made of, for example, silicon oxide. Electrode fingers 40 are electrically connected together through base conductor 38, and electrode fingers 39 are electrically connected together through base conductor **38*a* (see FIG. 24). Base conductors 38, 38*a* consist (preferably) of a gold layer, while electrode fingers 39, 40** preferably consist of the previously described ITO paste or of a transparent gold layer.

Figure 18:
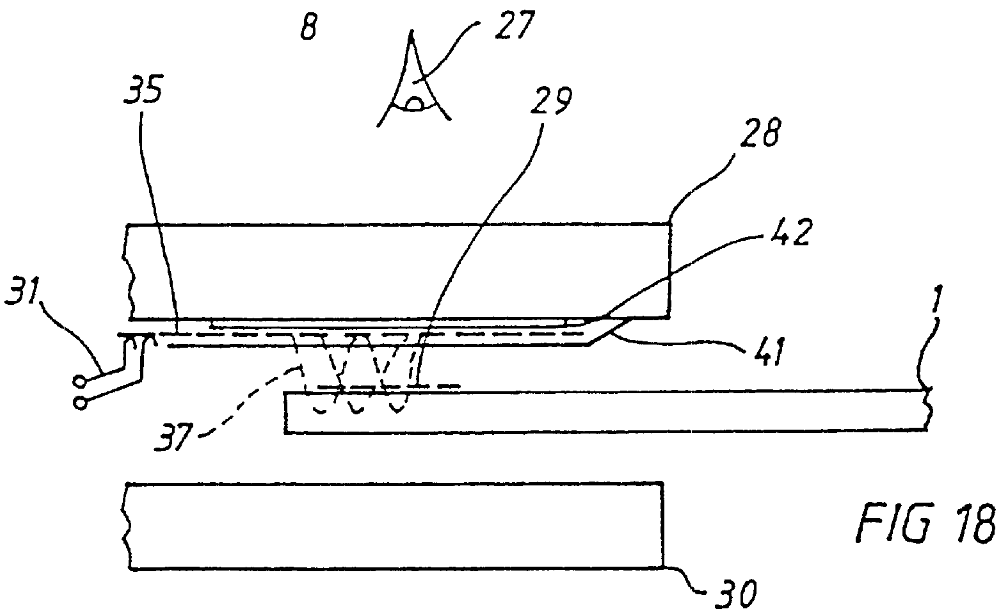
FIG. 18 shows another design of a security document arrangement in a test device as a variation of the invention shown in FIG. 16.

FIG. 18 shows a variation to the embodiment of FIG. 16. In this design, a fluorescent layer 42 is located on the inside of the upper support 28. This layer is caused to illuminate by the emissions given off by the printed EL picture. Here, the illumination of the fluorescent layer 42 occurs either in the visible range or in the invisible range, and is an important part of the inventive concept.

Figure 19:
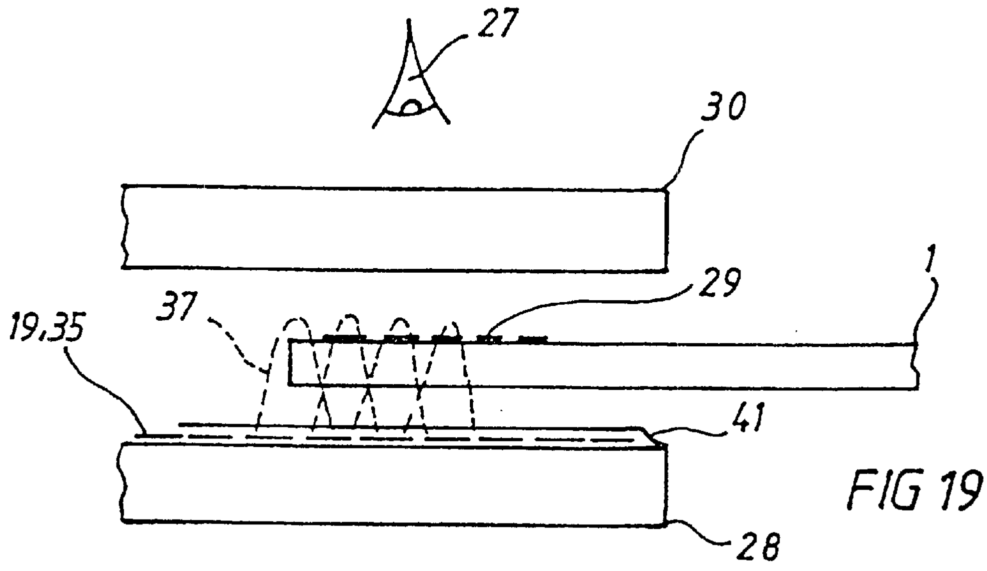
FIG. 19 is still another embodiment of the arrangement of a security document in a test device.

A modified embodiment compared to FIG. 16 is shown in FIG. 19, which shows that the previously described electrode arrangement 35 is fastened to a lower support 28 and the alternating fields produced by the electrode arrangement penetrate value/security instrument 1 from below. This product can then be viewed easily from above through transparent support 30 without needing to place an electrode arrangement into the line of sight.

FIGS. 16, 18, and 19 show that the alternating field 37 produced by the electrode arrangement 35 penetrates security document 1, at least in the vicinity of the printed EL picture 29.

Figure 20:
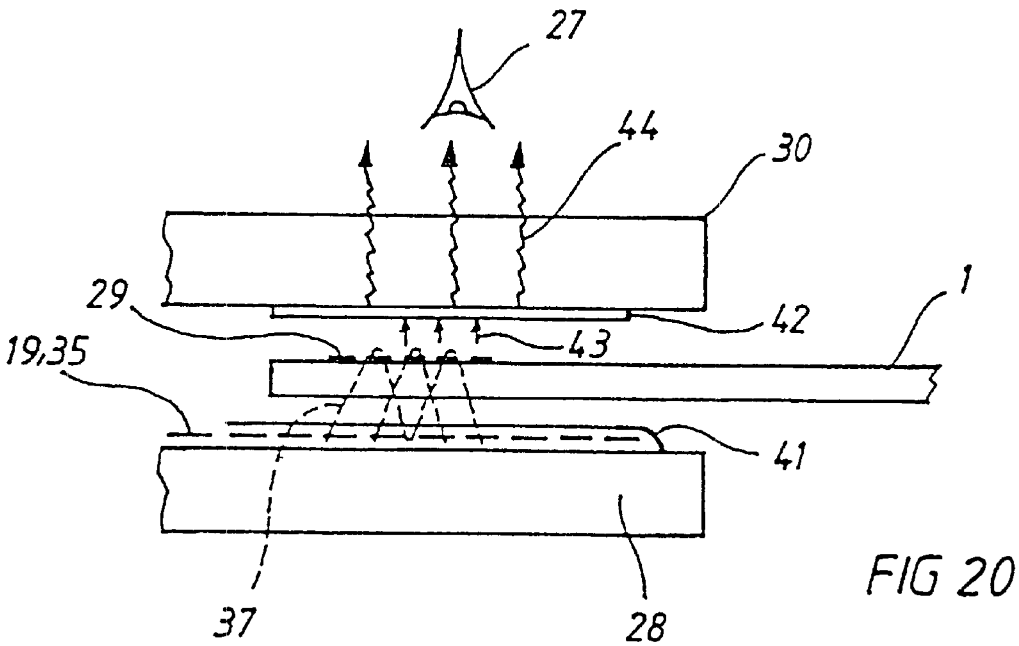
FIG. 20 is yet another alternative embodiment of the invention shown in FIG. 16.

In FIG. 20, it can be seen that emission 43 given off by the printed EL picture 29 arrives at fluorescent layer 42 as a primary emission. This primary emission then produces secondary emission 44 which can be detected either in the visible range by an observer 27 or, in the invisible range, can be evaluated by a testing device.

Figure 21:
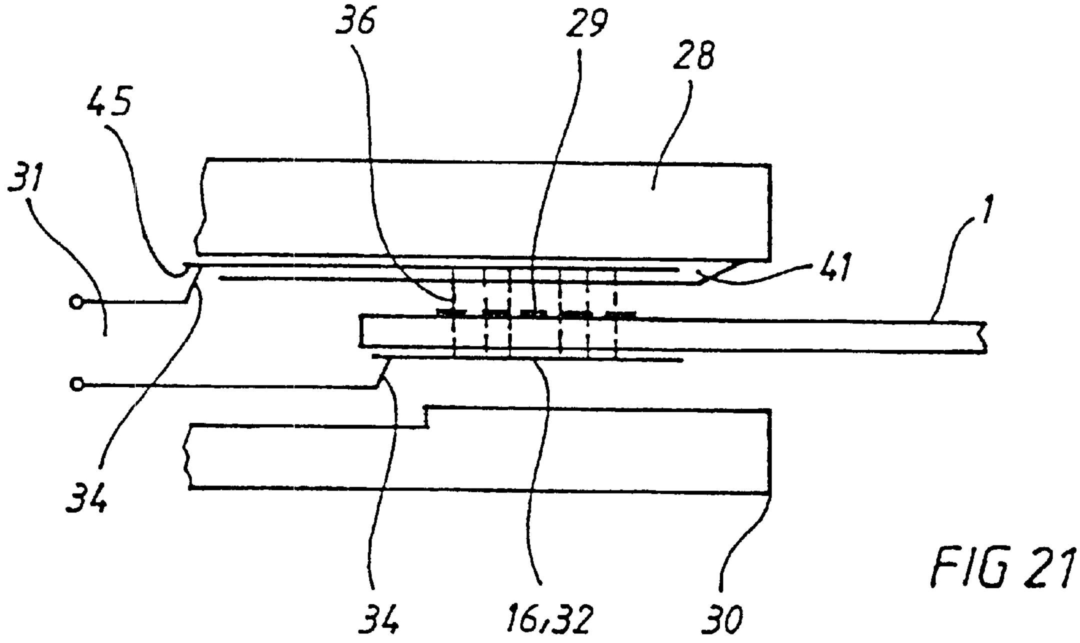
FIG. 21 shows a further alternative embodiment of the invention of FIG. 16.
Figure 22:
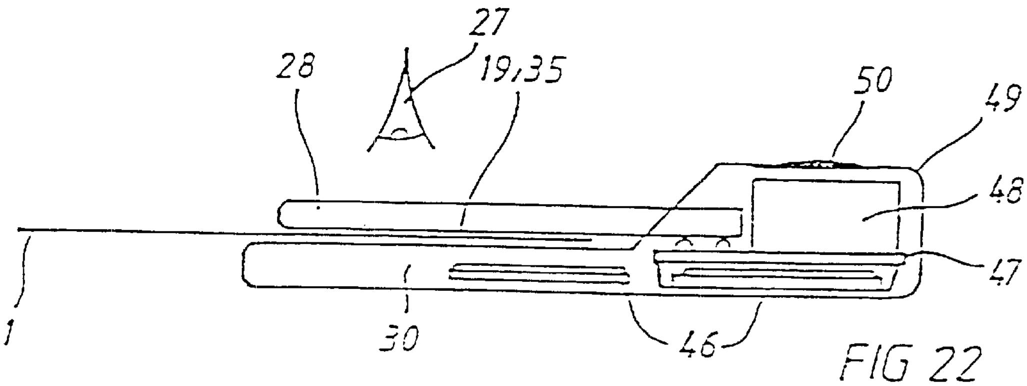
FIG. 22 is a schematic sectional view of a configuration of a test device in accordance with the invention.
Figure 23:
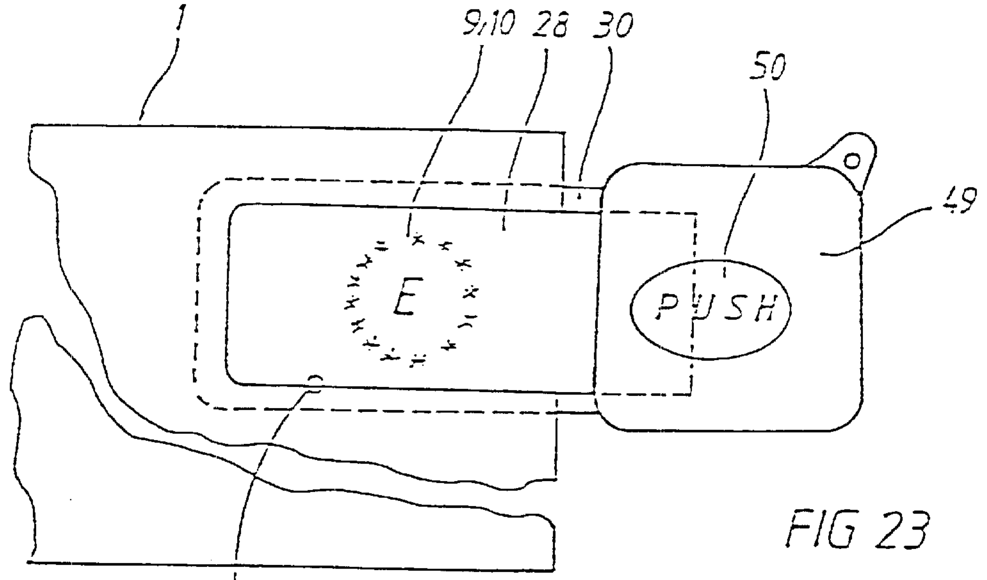
FIG. 23 is a top view of the FIG. 22 embodiment.

FIG. 21, together with the embodiment example in FIG. 14, shows that the value/security instrument can also be layered on one of its sides—for example the lower side—with an electrode 32. This electrode is in contact with contact 34. The other contact is located as a flat contact coming from the inside of the upper, transparent support 28. The above electrode arrangement is covered by an isolation layer so that the full-surfaced ITO or gold layer, which is designed as an electrode at that point, is as completely covered by the isolation layer 41 as possible. The other contact 34 electrically connects to this layer.

FIGS. 22–30 illustrate various concrete embodiment forms of a testing device to detect the emission of the printed EL picture 29. The testing device according to FIGS. 22–24 consist essentially of the two opposing supports 28, 30, between which an alternating electromagnetic field exists in the intervening space. On one side of these two supports 28, 30 is a housing 49 that has a switch 50 on top of it and which houses corresponding batteries 46 to provide current. It also houses an electronic circuit board 47 containing the electronics 48. By pressing the switch 50, the alternating electromagnetic field is produced that at least partially penetrates the printed EL picture 29 that is designed as a security feature 9, 10 (FIGS. 6 & 7), thus causing it to illuminate.

Figure 24:
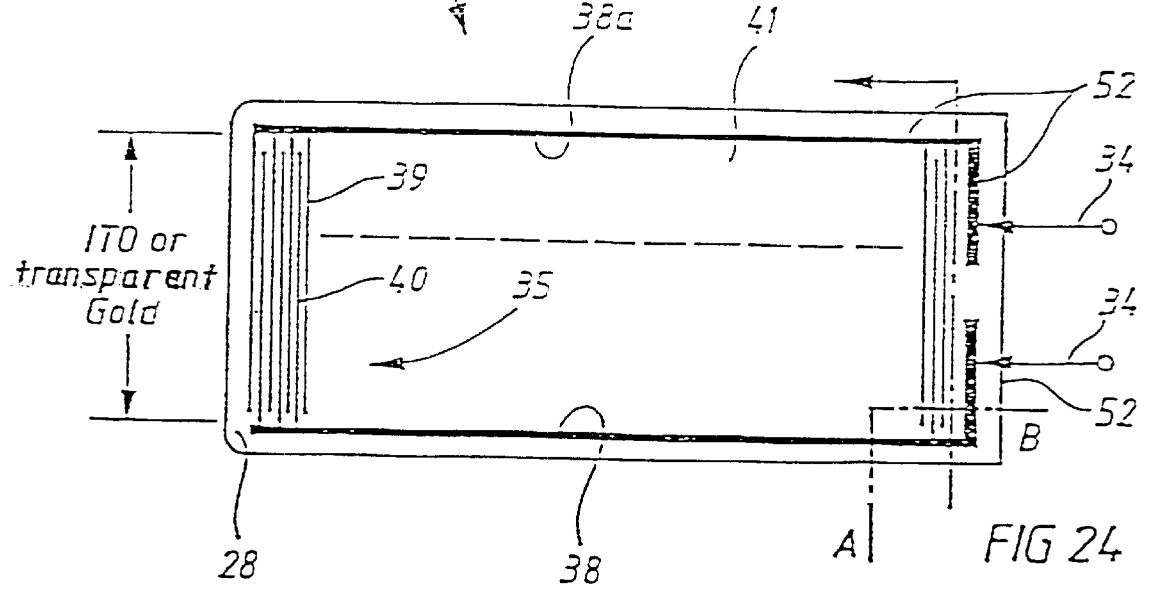
FIG. 24 is a top view of an electrode arrangement as used in the test device of the invention.

FIG. 24 shows that the previously described electrode arrangement 35 can be located either on the inside of the lower support 30 or on the inside of the upper support 28.

Figure 25:
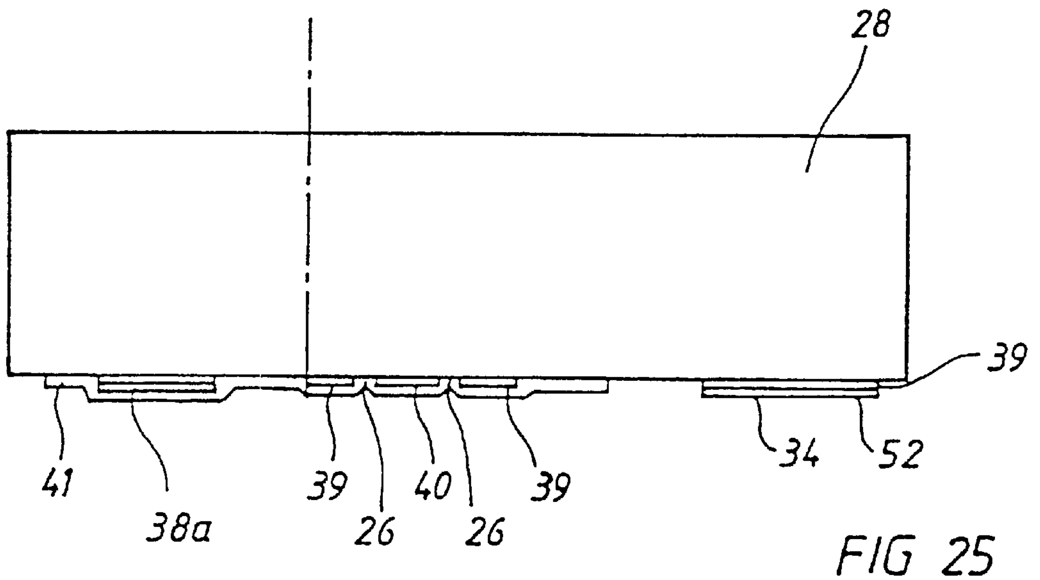
FIG. 25 shows an embodiment of electrodes in the test device of the invention.
Figure 26:
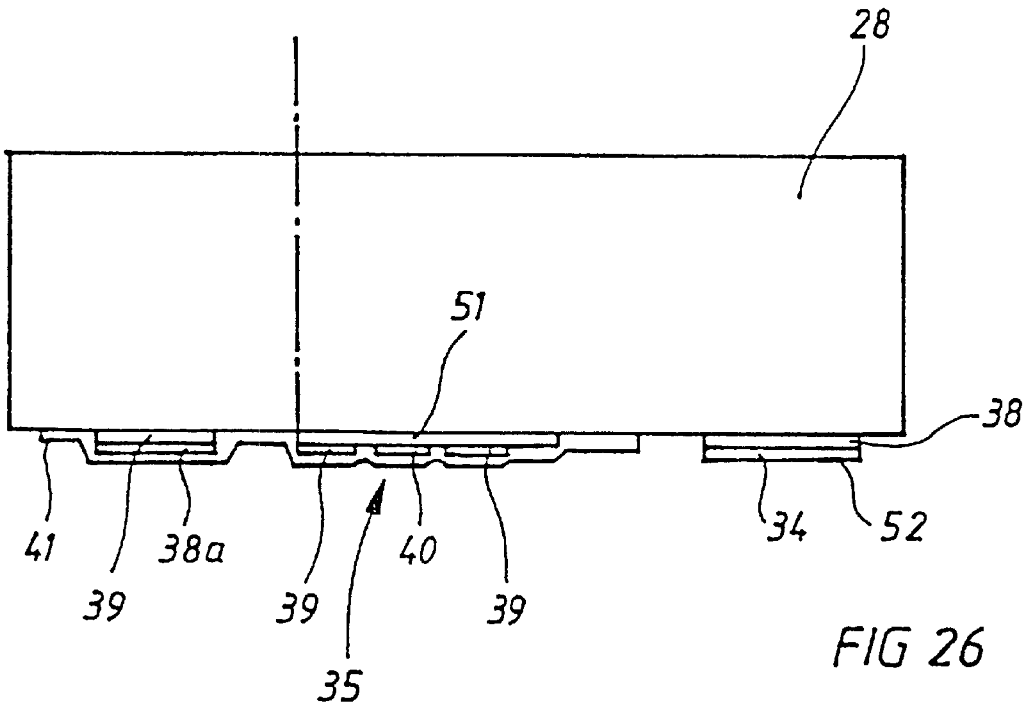
FIG. 26 is an alternative embodiment of the invention shown in FIG. 25.

FIGS. 25 and 26 show that the electrode fingers 39, 40 are separated at a distance from one another and form parallel field gaps 26 between them. The entire arrangement is then connected to contacts 34 using conducting contact surfaces 52 applied for this purpose. In addition, another luminescent layer 51 can be arranged on the inside of the support 28. The function of this luminescent layer was already explained with respect to FIG. 20.

Figure 27:
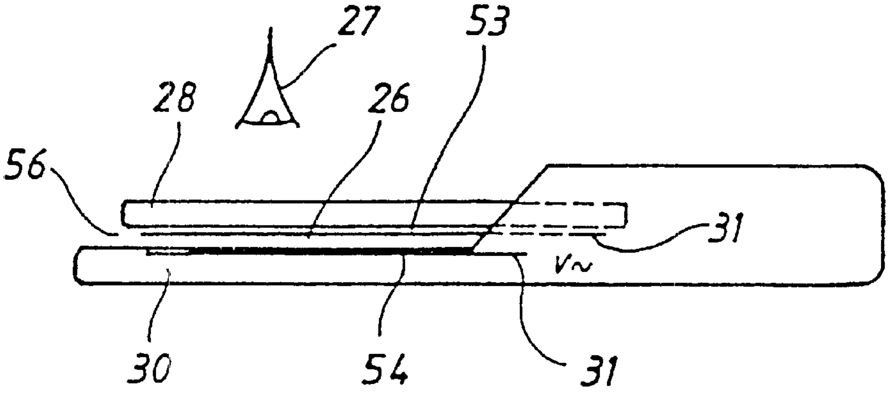
FIG. 27 shows a test device used in the invention.
Figure 28:
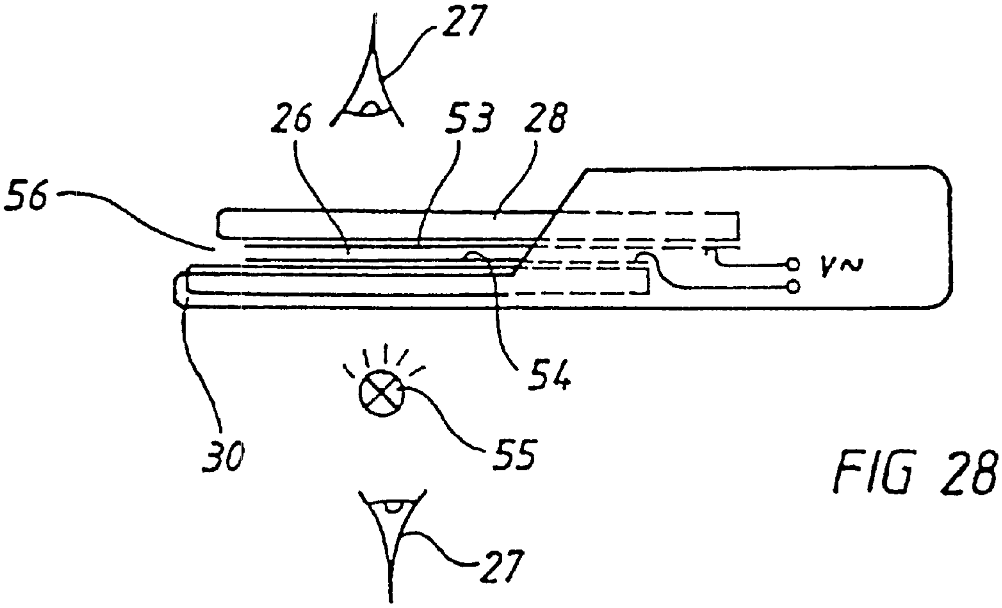
FIG. 28 is an alternative embodiment of the FIG. 26 test device.

In contrast to the previously described finger-like meshing electrodes, FIGS. 27 and 28 describe electrodes 53, 54 that are also arranged opposite one another and are contacted using corresponding connectors 31. In addition, according to FIG. 28, another illumination source 55 of any desired type (see the general description—low pressure gas discharge lamps, laser arrangements, among others) can be used to attain additional excitation of the printed EL picture. In all cases, value/security instrument 1 to be tested is inserted into the testing device through the inlet gap 56.

Figure 29:
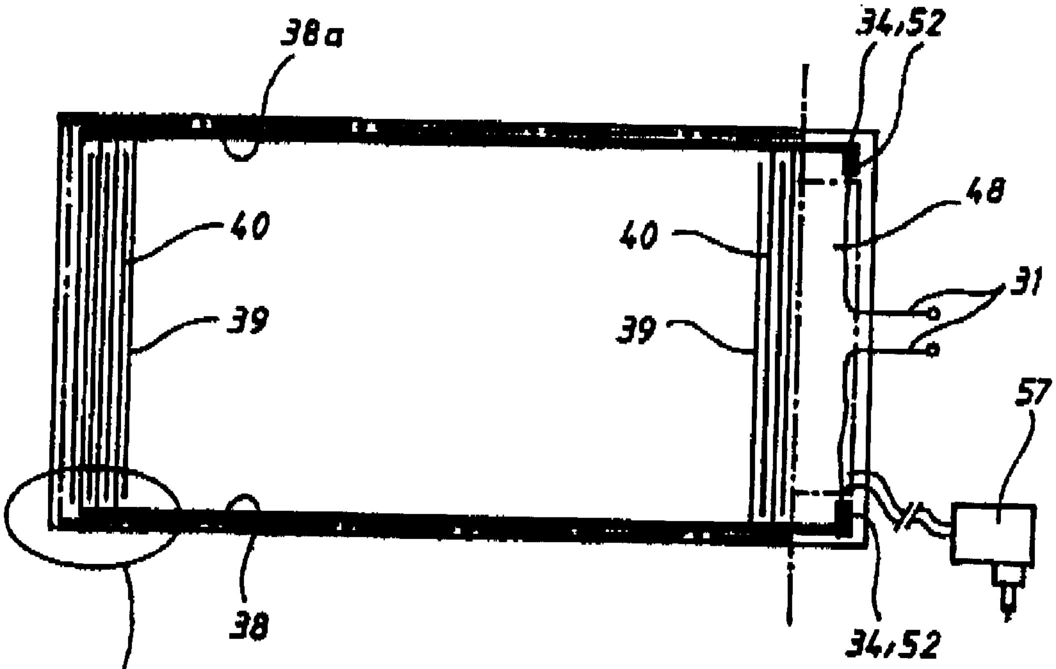
FIG. 29 is a top view of an electrode arrangement in a test device in accordance with the invention.
Figure 30:
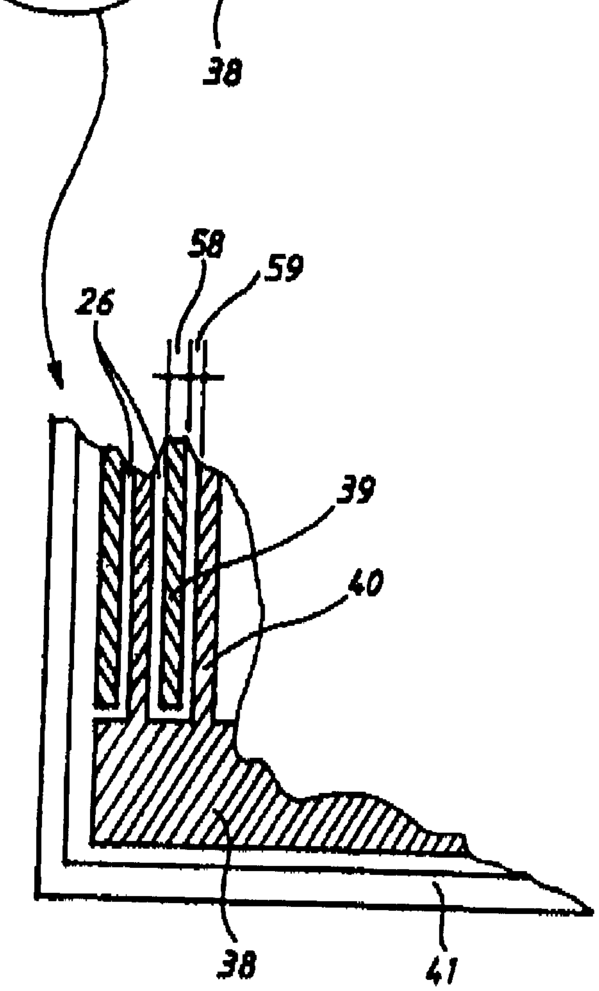
FIG. 30 is an enlarged version of the FIG. 29 embodiment.

FIGS. 29 and 30 show how electrode arrangement 35 is integrated into the testing device. It can be seen here that contacts 34 sit against contact surfaces 52 and are directly fed to electronics 48. Power supply 57 can be connected here. In a preferred embodiment, electrode arrangement 35 has electrode fingers 39, 40 opposite to one another and isolated from one another. Conductor widths 58 of typically 100 $\mu$m are preferred with a conductor separation 59 of preferably 50 $\mu$m. To isolate this arrangement, an oxide layer is applied to its entirety using evaporation techniques.

In view of the above description it is likely that modifications and improvements will occur to those skilled in this technical field which are within the scope of the invention. Accordingly, the invention is to be limited only by the spirit and scope of the claims and equivalents thereof.

What is claimed is:

1. A value/security instrument with embedded security elements containing substances that have electroluminescent (EL) properties and that emit radiation within an alternating electric field, said instrument comprising:

an essentially planar electrode arrangement is placed on said instrument; and electrodes located on approximately the same plane lying adjacent to one another formed with a field gap between them, wherein the EL substances are penetrated by the field lines of the alternating electric field produced within the field gap.

2. The instrument according to claim 1, wherein said EL substances are placed approximately flat on top of and parallel to said electrodes at least near said field gap.

3. The instrument according to claim 1 or 2, wherein said EL substances are placed flat beneath and parallel to said electrodes at least near said field gap.

4. The instrument according to claim 1 or 2, wherein said electrode arrangement consists of electrode fingers that mesh into one another, said electrode fingers forming a meandering field gap between them.

5. The instrument according to claim 1 or 2, wherein the EL substances form a printed EL picture that emits either visible or invisible primary radiation.

6. The instrument according to claim 1 or 2, and further comprising additional illuminating dyes to form pigments added to a mixture of print dyes and binders.

7. The instrument according to claim 5, wherein the printed picture containing said EL substances is covered with translucent print dyes.

8. The instrument according to claim 7, and further comprising a UV filter added to said translucent print dyes, or is provided in the form of encapsulated pigments.

9. A process to manufacture a security document, printed using steel plate deep-engraved intaglio printing with a number of deep-engraved intaglio dyes, wherein the process comprises the steps of:

graphical structuring of substrates, in particular special security paper of up to 200 gr/m$^2$ surface weight using intaglio printing techniques, screen printing techniques and other printing processes;

printing of lateral electrodes using conducting pastes, said electrodes having electrical connector sites;

printing of an isolation dye;

printing of an EL substance at least partially over the electrodes;

printing passivating, electrically conducting dyes onto the electrical connector sites in the form of conducting dyes or pastes, in particular based on carbon and gold;

printing of an elastic, transparent, friction-resistant protective layer, in particular based on aqueous polyurethane dispersions; and hardening of the printed material following the printing process.

10. The process according to claim 9, and comprising the further step, prior to printing, of applying adhesive agent in the form of an aqueous polyurethane dispersion to achieve optimal adhesion and embedding of the printed layers to follow.

11. The process according to claim 9, wherein the isolation dye applied in the isolation dye printing step contains aqueous polyurethane dispersion systems and/or barium titanate ($BaTiO_2$), said dye having a dielectric constant which is raised by said dispersion systems and/or $BaTiO_2$.

12. The process according to claim 9, wherein EL substances printed in the EL substance printing step consist of multi-colored electroluminescent pastes to which "range spacers" are added, if needed, thereby forming microencapsulated light pigments, said spacers preventing the microencapsulated light pigments from being damaged by the high pressures during printing.

13. The process according to claim 9, wherein after the EL substance is printed in the EL substance printing step, translucent dyes are printed above or below the EL substance to achieve additional graphical and security structure.

14. The process according to claim 9, and comprising the further step of applying a thermal press at temperatures up to 200° C. and pressures up to 500 N/cm$^2$ after the last process step to stabilize and improve the quality of the security document.

15. A testing device to visually and/or machine test the authenticity of value/security documents that have EL-active security features at certain points thereon, said features containing electroluminescent substances, the testing device comprising:

two supports on the testing device parallel to one another between which the document to be tested is placed, at least one of said supports being transparent;

an electrode arrangement on at least one of said supports, said electrode arrangement being capable of producing an alternating electric field that penetrates the value/security instrument at least at those points where the EL-active security features are located, thus exciting the EL-active security features so that they emit photons that can be evaluated either visually or by machine.

16. The testing device according to claim 15, wherein both electrodes are located on one side of one of said stationary supports in the form of a common electrode arrangement.

17. The testing device according to claim 15 or 16, wherein said electrode arrangement is essentially planar with electrodes located in approximately the same plane and lying adjacent to one another that form a field gap between each other, wherein the EL-active security features are penetrated by the field lines of the alternating electric field produced in the field gap.

18. The testing device according to claim 17, wherein said electrode arrangement consists of electrode fingers that mesh with one another, said electrode fingers forming a meandering field gap between each other.

19. The testing device according to claim 15 or 16, wherein said electrode arrangement is applied onto an isolation layer.

20. A testing device to visually and/or machine test the authenticity of value/security documents having EL active security features at certain points thereon, said features containing electroluminescent substances, the testing device comprising:

two supports parallel to one another between which the document to be tested is placed, at least one of said supports being transparent;

electrodes located at both said supports and producing an alternating electric field between each other similar to a plate condenser, said electric field penetrating the value/security instrument at least at the points where the EL-active security features are located, resulting in the EL-active security features being excited to the point of emitting photons that can be visually or mechanically evaluated.

21. The testing device according to claim 20, wherein both said electrodes are located opposite one another on said supports and the value/security instrument is placed in an inlet gap between said electrodes.

22. A testing device to visually and/or machine test the authenticity of value/security documents having EL active security features located at certain points thereon, said features containing electroluminescent substances, the testing devices comprising:

two supports parallel to one another between which the document to be tested is placed, at least one of said supports being transparent;

a first electrode located on the value/security instrument; and a second electrode located on one of said supports resulting in an alternating electric field being produced between said two electrodes that penetrates the value/security instrument at least at the points where the EL-active security features are located, thus resulting in the EL-active security features being excited to the point of emitting photons that can be visually or mechanically evaluated.

23. The testing device according to one of claims 15, 16, 20, 21 or 22, wherein at one of said support plates a fluorescent layer is located that produces secondary radiation in the visible range from primary radiation (visible or invisible) emitted from one of the EL-active security features.

24. A value and security product with an area comprising:

a printed layer comprising:

a print dye having at least one electroluminescent substance embedded therein as a security feature, wherein said electroluminescent substance emits an electromagnetic radiation in the form of electroluminescence by excitation within an alternating electric field produced by an essentially planar electrode arrangement having electrodes located on approximately the same plane and adjacent to each other, said electrodes forming a field gap between them and penetrate said electroluminescent substance with electric field lines; and a thickness selected such that the electroluminescence is excitable by means of the alternating electric field.

25. The value and security product according to claim 24, wherein the printed layer is produced by means selected from the group consisting of intaglio printing, offset printing and screen-printing.

26. The value and security product according to claim 24, wherein the electroluminescent layer is provided in microencapsulated condition.

27. The value and security product according to claim 24, and further comprising a UV filter in the encapsulation.

* * * * *